United States Patent Office 3,773,915
Patented Nov. 20, 1973

3,773,915
COMPOUND OF RHODIUM AND MOLYBDENUM
AND METHOD OF MANUFACTURE
Louis Degueldre and Yves Gobillon, Brussels, Lucien Clerbois, Vilvoorde, and Louis Bourgeois, Brussels, Belgium, assignors to Solvay et Cie, Brussels, Belgium
No Drawing. Filed Jan. 3, 1972, Ser. No. 215,158
Claims priority, application Luxembourg, Jan. 13, 1971, 62,411
Int. Cl. C01g 39/00, 55/00
U.S. Cl. 423—593                2 Claims

ABSTRACT OF THE DISCLOSURE

Manufacture of an oxidic compound of rhodium and molybdenum of empirical formula $Rh_2MoO_6$ having semiconducting properties, suitable for coating electrodes for use in electrochemical processes.

---

The present invention relates to a new oxidic compound of rhodium and molybdenum of empirical formula $Rh_2MoO_6$ and to a method for its manufacture. The structural characteristics of the compound, its crystallographic parameters and certain physical and chemical properties, particularly its electrical conductivity and its resistance to corrosion, have been defined as described hereinafter.

The new compound is prepared by mixing a rhodium salt, suitably rhodium trichloride ($RhCl_3 \cdot xH_2O$), and an excess of molybdic oxide ($MoO_3$), grinding and then compacting the mixture and submitting the compacted mixture to a thermal treatment in an oxidising atmosphere first at a temperature of 500° C. and then at a temperature at 650° C.

The hydrated rhodium trichloride starting material used in the following example was a product of Johnson Matthey & Co. The molybdic oxide was of analytical reagent quality.

2.88 g. of molybdic oxide were mixed with 2.65 g. of hydrated rhodium trichloride to prepare the compound $Rh_2MoO_6$. The mixture was then ground in an agate mortar so as to obtain a homogeneous mixture, which was compacted at ambient temperature under a pressure of 1500 kg./cm.² and then given a thermal treatment for 60 hours in air at a temperature of 500° C. followed by a thermal treatment for 48 hours at 650° C.

The compact thus obtained was ground to powder of particle size 1 micron or less. This powder was given a hot wash first with ammonium hydroxide of 7 N concentration to remove the excess molybdic oxide and then with demineralised water and was afterwards dried in an oven at 90° C.

X-ray crystallographic analyses carried out on the powder thus obtained showed that the mixed oxide $Rh_2MoO_6$ crystallises in the tetragonal system and is of the trirutile type. The parameters of the unit cell are as follows:

$$a_0 = 4.606 \text{ A. and } c_0 = 9.054 \text{ A.}$$

The unit cell contains 2 molecules of $Rh_2MoO_6$.

The intensities of the diffracted rays and the reticular distances observed are shown in the following table.

| Intensity | h | k | l | $d$ (A.) $Rh_2MoO_6$ |
|---|---|---|---|---|
| vw | 1 | 0 | 1 | 4.11 |
| s  | 1 | 1 | 0 | 3.25 |
| s  | 1 | 0 | 3 | 2.52 |
| m  | 2 | 0 | 0 | 2.303 |
| m  | 1 | 1 | 3 | 2.21 |
| w  | 2 | 0 | 2 | 2.06 |
| vw | 1 | 1 | 4 | 1.865 |
| vs | 2 | 1 | 3 | 1.701 |
| ms | 2 | 2 | 0 | 1.629 |
| ms | 0 | 0 | 6 | 1.514 |
| ms | 3 | 1 | 0 | 1.457 |
| s  | 3 | 0 | 3 | 1.369 |
| ms | 2 | 0 | 6 | 1.262 |

NOTE.—w=Weak; s=Strong; m=Medium; v=Very.

The results of these crystallographic analyses show that the thermal treatments of the starting materials were sufficient to bring about complete interaction of the oxides and also a good degree of crystallisation.

In order to measure the electrical conductivity of the compound $Rh_2MoO_6$ the powder resulting from grinding the aforesaid porous discs was again compacted under the same conditions as before. The electrical conductivity of these compacts was then found to be of the order of $10^{-4}$ (ohm.cm.)$^{-1}$. The compact behaved as a semiconducting body with an activation energy of 0.04 ev.

The preparation of the compound involves a very simple technique in which the operating conditions are completely reproducible. When used as an anodic surface in the electrolysis of sodium chloride the new compound showed very interesting polarisation properties and excellent resistance to corrosion under the conditions ruling in the cell.

Because of its properties, the compound $Rh_2MoO_6$ is suitable for industrial use not only as an electrode in various electrochemical processes but also as an oxidation catalyst in organic chemistry and as a constituent of composite semiconducting materials.

What we claim:
1. An oxidic compound of rhodium and molybdenum corresponding to the formula $Rh_2MoO_6$, said compound crystallizing in the tetragonal trirutile form with unit cell parameters $a_0$ and $c_0$ respectively 4.606 A. and 9.054 A., and having an electrical conductivity of the order of $10^{-4}$ (ohm.cm.)$^{-1}$ and an activation energy of 0.04 ev.
2. A method for the manufacture of an oxidic compound of rhodium and molybdenum in accordance with claim 1, which comprises mixing rhodium chloride and an excess of molybdic oxide ($MoO_3$), grinding and then compacting the mixture, submitting the compacted mixture to a thermal treatment in an oxidising atmosphere first at a temperature of 500° C. and then at a temperature of 650° C., then grinding the thermally treated compact to powder and removing excess molybdic oxide from the powder.

References Cited

UNITED STATES PATENTS

| 3,689,384 | 9/1972 | Barbato et al. | 204—240 F |
| 3,711,397 | 1/1973 | Martinsons | 204—291 |
| 3,153,085 | 10/1964 | Hadley | 252—470 X |

FOREIGN PATENTS

| 541,287 | 5/1957 | Canada | 252—470 |

OTHER REFERENCES

Blasse, "Journal of Inorganic & Nuclear Chemistry," vol. 28, 1966, pp. 1488–1489.

HERBERT T. CARTER, Primary Examiner